(12) United States Patent
Kitaori et al.

(10) Patent No.: US 6,712,190 B2
(45) Date of Patent: Mar. 30, 2004

(54) WET FRICTION PLATE ASSEMBLY

(75) Inventors: Ken Kitaori, Saitama (JP); Shigeru Tajima, Saitama (JP); Yuji Koga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/206,360

(22) Filed: Jul. 29, 2002

(65) Prior Publication Data

US 2003/0051967 A1 Mar. 20, 2003

(30) Foreign Application Priority Data

Sep. 20, 2001 (JP) ........................................ 2001-287140

(51) Int. Cl.$^7$ ............................................... F16D 13/72
(52) U.S. Cl. ............................. 192/113.36; 192/113.35; 192/113.34; 192/107 R; 192/70.12; 188/264 B
(58) Field of Search ....................... 192/113.34, 113.35, 192/113.36, 70.12, 107 R; 188/264 B

(56) References Cited

U.S. PATENT DOCUMENTS

| | | | | |
|---|---|---|---|---|
| 4,995,500 A | * | 2/1991 | Payvar | 192/107 R |
| 5,101,953 A | * | 4/1992 | Payvar | 192/70.12 |
| 5,335,765 A | * | 8/1994 | Takakura et al. | 192/113.36 |
| 5,460,255 A | * | 10/1995 | Quigley | 192/113.36 |
| 5,501,309 A | * | 3/1996 | Walth et al. | 192/113.36 |
| 5,671,835 A | * | 9/1997 | Tanaka et al. | 192/113.36 |
| 6,293,382 B1 | * | 9/2001 | Nishide et al. | 192/113.36 |

FOREIGN PATENT DOCUMENTS

| JP | 4-194422 | 7/1992 |
|---|---|---|
| JP | 11-141570 | 5/1999 |

* cited by examiner

*Primary Examiner*—Rodney H. Bonck
*Assistant Examiner*—Eric M. Williams
(74) *Attorney, Agent, or Firm*—Armstrong, Kratz, Quintos, Hanson & Brooks, LLP

(57) ABSTRACT

A wet friction plate assembly which is capable of discharging the lubricant existing between the friction plate and the separation plate to restrict the accompanying rotation of the separation plate of a wet multiple-plate clutch etc. while it is disengaged. A wet friction plate assembly for a wet multiple-plate clutch, or a wet multiple-plate brake includes a plurality of separation plates; a plurality of friction elements; and a plurality of friction plates, on contact surfaces of which the plurality of friction elements are fixed for transmitting torque to the plurality of separation plates in pressure contact, wherein the plurality of friction elements are disposed spacing at regular intervals circumferentially on each contact surface of the plurality of friction plates to form a plurality of oil passages for a lubricant between respective neighboring pairs of the plurality of friction elements, and wherein a width of each of the plurality of lubricant passages is increased progressively in a direction of inward to outward radially of each of the plurality of friction plates.

4 Claims, 7 Drawing Sheets

WET FRICTION PLATE ASSEMBLY

BACKGROUND OF THE INVENTION

1. Field of the Invention

The present invention relates to a wet friction plate assembly and, more particularly, relates to an improved wet friction plate assembly to transmit torque used for a wet multiple-plate clutch, a wet multiple-plate brake and the like.

2. Description of the Related Art

A wet multiple-plate clutch and a wet multiple-plate brake (hereinafter referred to as a wet multiple-plate clutch, etc.) have, generally speaking, been used widely in an automatic transmission. The wet multiple-plate, clutch etc., has plural friction plates and separation plates which are disposed alternately and transmits torque by holding them in pressure contact hydraulically. The seizure between the friction elements on a friction plate and a separation plate is prevented by providing the lubricant in the contact surface between them, when the wet multiple-plate clutch, etc., is in disengagement (when the friction plate and the separation plate are disengaged and are not able to transmit torque).

The increase of frictional force as a result of the lubricant shear possibly induces the accompanying rotation of the separation plate, thereby causing the power loss, when an unnecessarily large amount of the lubricant remains between the friction elements of the friction plate and the contact surface of the separation plate. This phenomenon tends to occur while a wet multiple-plate clutch, etc., is in disengagement, especially at a cold start when the lubricant has high viscosity.

Japan Laid-Open Patent 11-141570 discloses a friction plate which employs plural oil passages intersecting the friction elements of the friction plate radially and discharges the lubricant remaining between the friction plate and the separation plate through the oil passages assisted by the centrifugal force.

It has been difficult to reduce the accompanying rotation induced by the lubricant dragging during the disengagement of a wet multiple-plate clutch, etc., since the sufficient discharge of the lubricant is not attained by only forming the radial oil passages between the neighboring friction elements.

Japan Laid-Open Patent 04-194422 discloses the oil passage which has a larger width inward and a smaller one outward radially. However, the reduction of the outlet of the oil passage will adversely decrease the discharge capability of the lubricant in relation to the centrifugal force.

SUMMARY OF THE INVENTION

The object of the present invention to assess the problems described above is to provide a wet friction plate assembly which is capable of discharging the lubricant existing between the friction plate and the separation plate so that the accompanying rotation of the separation plate can be restricted while a wet multiple-plate clutch, etc., is in disengagement.

The present invention in a first embodiment provides a wet friction plate assembly for a wet multiple-plate clutch, a wet multiple-plate brake and the like, comprising: a plurality of separation plates; a plurality of friction elements; and a plurality of friction plates, on contact surfaces of which the plurality of friction elements are fixed for transmitting torque to the plurality of separation plates in pressure contact, wherein the plurality of friction elements are disposed spacing at regular intervals circumferentially on each contact surface of the plurality of friction plates to form a plurality of oil passages for a lubricant between respective neighboring pairs of the plurality of friction elements, and wherein a width of each of the plurality of lubricant passages is increased progressively in a direction of inward to outward radially of each of the plurality of friction plates.

The resistance depending on the reduction of the inlet of each oil passage acts on the lubricant to be introduced into each oil passage, and the centrifugal force depending on the rotational velocity of the friction plates acts on the lubricant remaining in each oil passage, when the inlet is reduced and the outlet is expanded. If the width of the oil passage is expanded progressively from inward to outward radially, the flow velocity of the lubricant within the passage will decrease. However, the static pressure of both sides of the oil passage will also decrease and the frictional force acting on both sides of the oil passage will accordingly decrease, thereby resulting in the decrease in the lubricant pressure in a direction of discharge.

The lubricant will be discharged smoothly even if the centrifugal force acting on the lubricant to discharge it from the oil passage is small. The accompanying rotation of the separation plate induced by the friction plate will thus be restricted, compared with a straight oil passage. On the other hand, the lubricant to be introduced into an oil passage will experience the resistance depending on the reduction of the inlet of the oil passage, thereby the minimum required amount of the lubricant remains upstream the oil passage inlet, so that the seizure between the friction plate and the separation plate is prevented.

A second embodiment of the present invention provides a wet friction plate assembly for a wet multiple-plate clutch, a wet multiple-plate brake and the like, comprising: a plurality of separation plates; a plurality of friction elements; and a plurality of friction plates, on contact surfaces of which the plurality of friction elements are fixed for transmitting torque to the plurality of separation plates in pressure contact, wherein the plurality of friction elements are disposed spacing at regular intervals both radially and circumferentially on each contact surface of the plurality of friction plates to form a plurality of radial and circumferential lubricant passages between respective neighboring pairs of the plurality of friction elements, and wherein a width of each of the plurality of radial lubricant passages is increased progressively in a direction of inward to outward radially of each of the plurality of friction plates.

The multiple-stage friction elements in a radial direction provide the radial and circumferential oil passages. High pressure is generated at an intersection of each of the radial and circumferential oil passages and thereby the uniform separation of the friction plate and the separation plate can be attained. Compared with the oil passage according to the first embodiment, the length of the oil passage is shorter and thereby the frictional resistance of the lubricant will be reduced. The lubricant will also be discharged with a smaller centrifugal force because the radial oil passages communicate with the circumferential oil passage. The amount of lubricant discharged per unit time will increase because the lubricant is discharged through both radial and circumferential oil passages. Therefore, the lubricant remaining in the oil passage can be discharged fast, which restrains the accompanying rotation of the separation plate induced by the friction plate due to the lubricant.

The lubricant to be introduced into the oil passage experiences the resistance caused by the reduction of the inlet of the oil passage, which is formed by the friction elements situated in the inner ring of the friction plate, and thereby the minimum required amount of the lubricant will remain upstream the inlet, so that the seizure of the friction plate and the separation plate is prevented.

The present invention according to a third embodiment provides a wet friction plate assembly for a wet multiple-plate clutch, a wet multiple-plate brake and the like according to the second embodiment, wherein some of the plurality of friction elements situated in an outer ring are offset circumferentially from the others of the plurality of friction elements situated in an inner ring.

The circumferential offset, which is provided for some of the friction elements situated in the outer ring and the others situated in the inner ring, makes it possible to discharge the lubricant effectively, because the Coriolis force acts on the lubricant which passes through the radial and circumferential oil passages. If the circumferential offset is determined based on the difference in the circumferential velocity between the inner and the outer of the separation plate, the accompanying rotation of the separation plate induced by the friction plate will be restricted since the lubricant is discharged more smoothly out of the radial and circumferential oil passages. It is accompanied by the prevention of the seizure of the friction and separation plates because the lubricant to be introduced into the oil passage formed by the friction elements situated in the inner ring of the friction plate experiences the resistance by the reduction of the oil passage inlet, so that the minimum required amount of the lubricant remains upstream the inlet.

The present invention according to a fourth embodiment provides a wet friction plate assembly for a wet multiple-plate clutch, a wet multiple-plate brake and the like according to the second embodiment, wherein some of the plurality of friction elements situated in an outer ring are offset a half pitch circumferentially from the others of the plurality of friction elements situated in an inner ring.

"Offset a half pitch" means that the friction elements are so disposed that any oil passage through which the lubricant passes from the inward to the outward of the friction plate has the same shortest distance. The friction plate with the offset improves the assembly efficiency because its directional restriction relative to the wet multiple-plate clutch, etc., is obviated. The accompanying rotation of the separation plate induced by the friction plate is restricted since the lubricant is discharged more smoothly in a direction of the Coriolis force out of the radial and circumferential oil passages. It is accompanied by the prevention of the seizure of the friction and separation plates since the lubricant to be introduced into the oil passage formed by the friction elements situated in the inner ring of the friction plate experiences the resistance by the reduction of the oil passage inlet, so that the minimum required amount of the lubricant remains upstream the inlet.

BRIEF DESCRIPTION OF THE DRAWINGS

FIG. 8 is an explanatory view of the flow in a typical duct or in the oil passage according to the present invention.

DESCRIPTION OF THE PREFERRED EMBODIMENTS

The present invention, which is applied to an automatic transmission, will be described referring to FIGS. 1–9.

Figure 1:
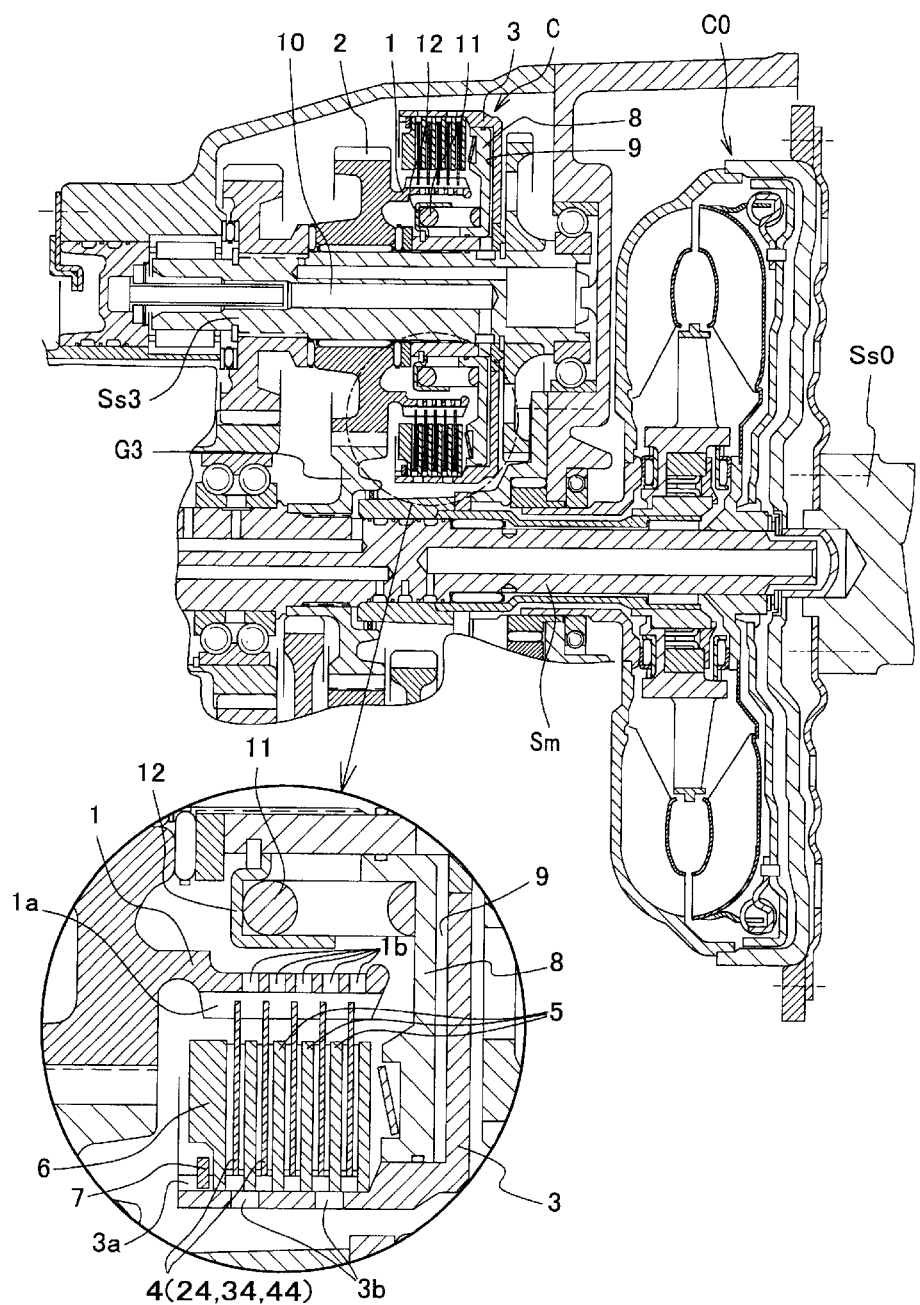
FIG. 1 is a sectional view showing the main portion of an automatic transmission in detail according to the present invention.

FIG. 1 is a sectional view showing the third speed of an automatic transmission. Ss0 shows an engine power shaft, Sm an automatic transmission main shaft, Ss3 an automatic transmission sub-shaft (third speed), C a wet multiple-plate clutch for coupling the main shaft Sm and the sub-shaft Ss3 and C0 a fluid coupling which is for coupling the engine power shaft Ss0 and the main shaft Sm.

As shown in FIG. 1, the main shaft Sm and the sub-shaft Ss3 are placed in parallel. A gear G3 for the third speed shifting of the main shaft Sm meshes with an input gear 2 which is integrated with a clutch center 1 of the wet multiple-plate clutch C. A clutch guide 3 of the wet multiple-plate clutch C is spline connected to the sub-shaft Ss3.

A plurality of friction plates 4 of ring like shapes of the wet multiple-plate clutch C are spline connected to a spline shaft 1a which is formed on the outer circumferential surface of the clutch center 1. A plurality of separation plates 5 are spline connected to a spline hole 3a which is formed on the inner circumferential surface of the clutch guide 3.

On the end inside the clutch guide 3 is secured an end plate 6 and outside the end plate 6 is secured a stopper 7 of a ring-like shape (holding ring for a hole). Inside the clutch guide 3 is disposed a clutch piston 8, which engages the wet multiple-plate clutch C by holding the friction plates 4 and the separation plates 5 in pressure contact that are arrayed alternately in an axial direction. A working fluid passage 10 which communicates with a clutch fluid reservoir 9 is provided in the core of the sub-shaft Ss3. A return spring 11 which is for returning the clutch piston 8 into the disengaged position and a spring retainer 12 are installed in the clutch center 1.

Figure 2:
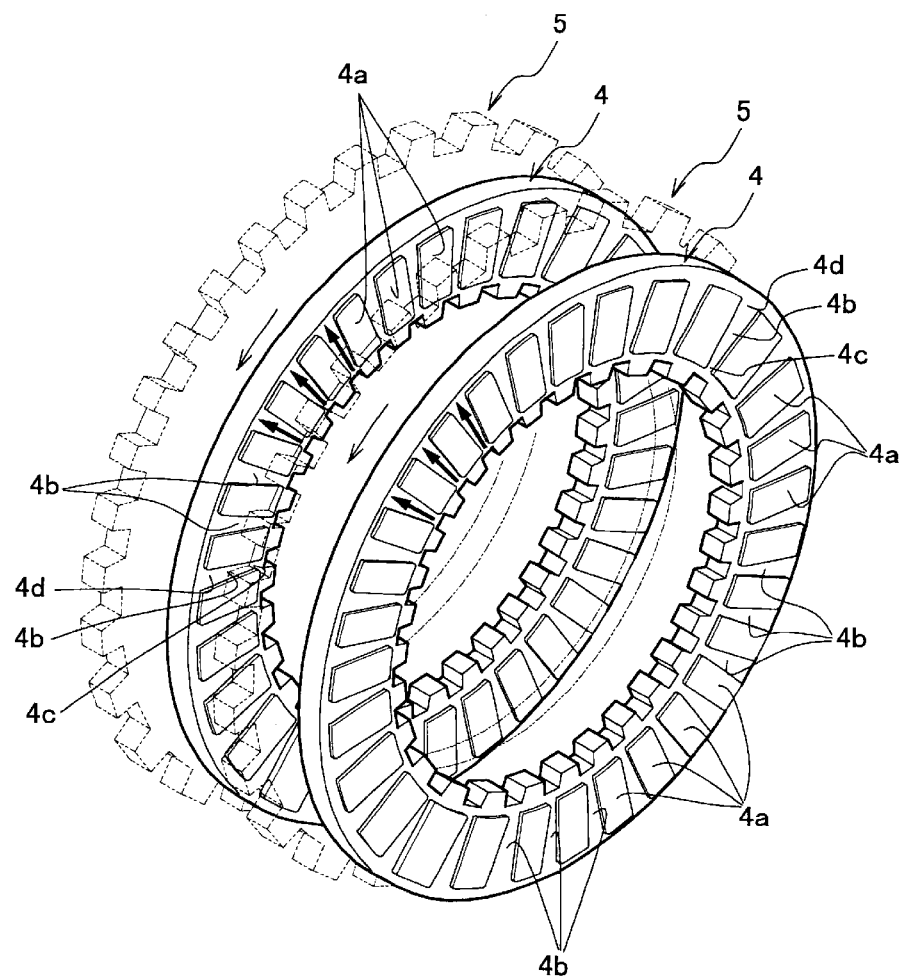
FIG. 2 is an explanatory perspective view illustrating the structure of a friction plate and its allocation relative to a separation plate according to a first embodiment of the present invention.

A first embodiment of the friction plates 4 and the separation plates 5 is shown in FIG. 2.

As shown in FIG. 2, a plurality of friction elements 4a to transmit the torque are fixed on both sides of each of the friction plates 4 spacing at the regular intervals circumferentially. Between respective neighboring pairs of the friction elements 4a are formed a plurality of oil passages 4b. Each of the oil passages 4b extends radially from the inward to the outward end. The width of each of the oil passages 4b increases progressively from an inlet 4c to an outlet 4d, resulting in the maximum at the outlet 4d. The width of the inlet 4c of each of the oil passages 4b is determined so that the minimum amount of the lubricant required for lubrication can remain upstream the inlet 4c assisted by the reduction effect of the inlet 4c while the friction plates 4 are rotating. In this connection, the smaller spacing of the friction elements is, the less the discharge capability of the lubricant will be. On the other hand, the larger it is, the less the torque transmission capability will be when the friction plates 4 and the separation plates 5 are engaged. Therefore, spacing is determined taking into account the discharge capability of the lubricant and the torque transmission capability while the friction plates 4 and the separation plates 5 are engaged.

Reducing the inlet 4c of each of the oil passages 4b and enlarging the outlet 4d, the lubricant to be introduced into each of the oil passages 4b experiences resistance depending on the reduction effect and the lubricant existing in each of the oil passages 4b is exerted on the centrifugal force depending on the rotational velocity of the friction plates 4. If the width of each of the oil passages 4b is increased progressively from inward to outward radially, the lubricant velocity within each of the oil passages 4b decreases and the frictional force acting on both sides of each of the oil passages 4b also decreases due to the static pressure drop, which accordingly leads to the decrease in the lubricant pressure in a discharging direction. The lubricant is discharged more smoothly with the smaller centrifugal force out of the oil passages 4b and thereby the accompanying rotation of the separation plates 5 induced by the friction plates 4 due to the remaining oil is prevented more securely, compared with the case where the oil passages 4b are assumed to be straight. The lubricant to be introduced into each of the oil passages 4b experiences the resistance caused by the reduction of the inlet 4c, so that the minimum required lubricant remains upstream the inlet 4c, which will prevent the seizure of the friction plates 4 and the separation plates 5.

Figure 3:
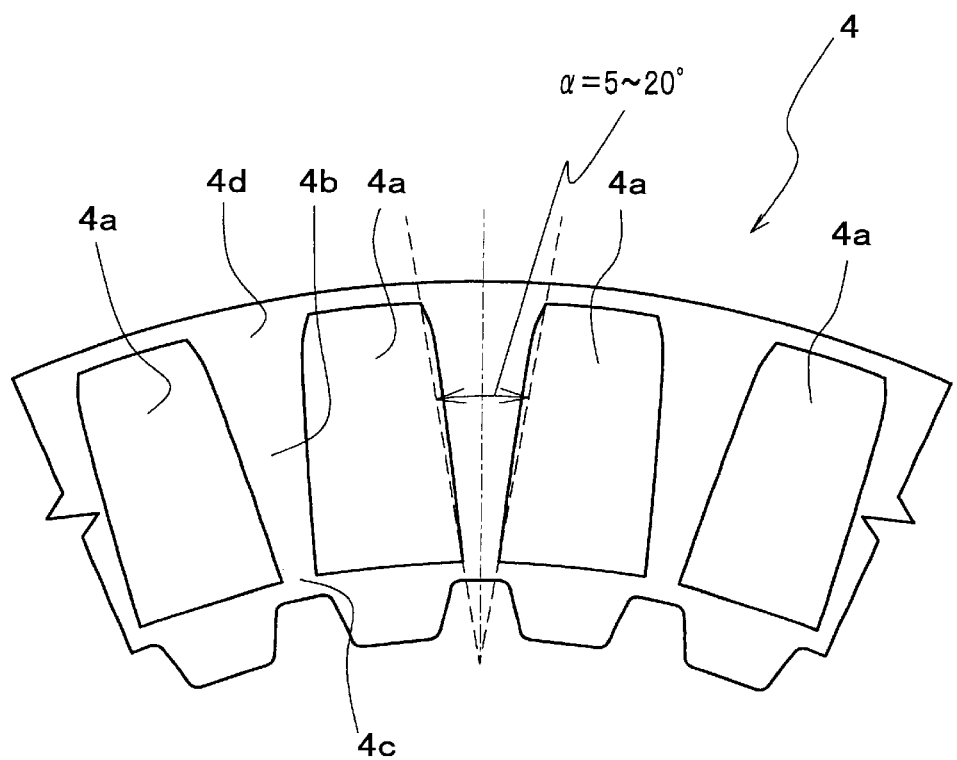
FIG. 3 is a detailed view showing the configuration of the friction elements to be fixed on the friction plate according to the first embodiment of the present invention.

As shown in the enlarged view of FIG. 3, both sides of each of oil passages 4b are curved and the angle of divergence α of each of the oil passages 4b should be 5–20 degrees, preferably 10–11 degrees.

Figure 8A:
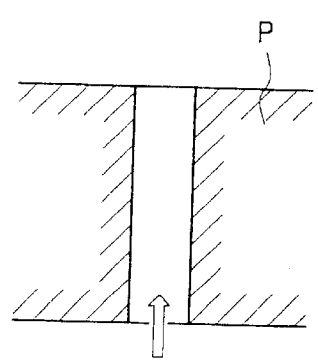
FIG. 8A is a view showing the flow of a lubricant (fluid) in a typical duct.
Figure 8B:
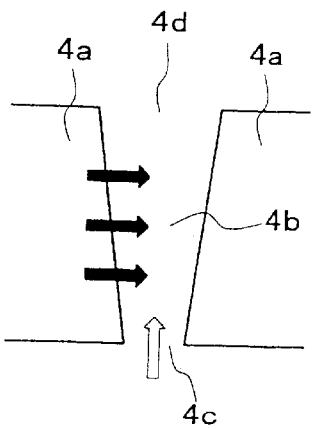
FIG. 8B is a view showing the flow and direction of the lubricant in the oil passage according to the present invention.

Each of the oil passages 4b is a groove having the cross section of U-shape opening toward each of the separation plates 5, which is different from a typical duct P shown in FIG. 8A. It is provided with the angle of divergence α as shown in FIG. 8B so that the lubricant entering circumferentially with the rotation of the friction plates 4 may also be discharged.

Figure 8C:
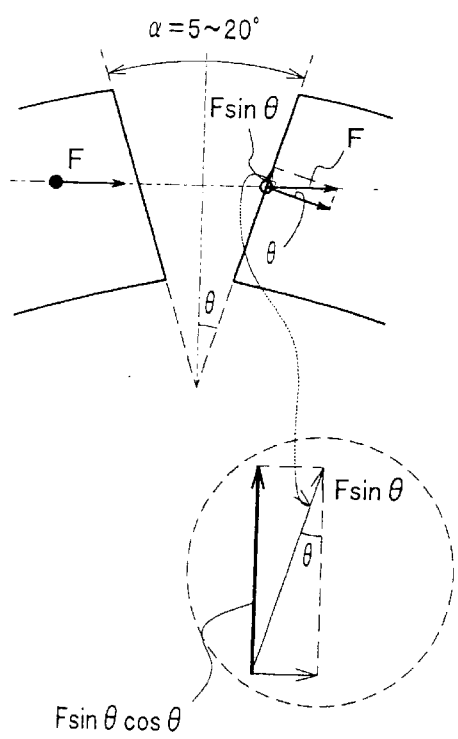
FIG. 8C is a vector view showing the flow, direction and amount of the lubricant in the oil passage according to the present invention.
Figure 8D:
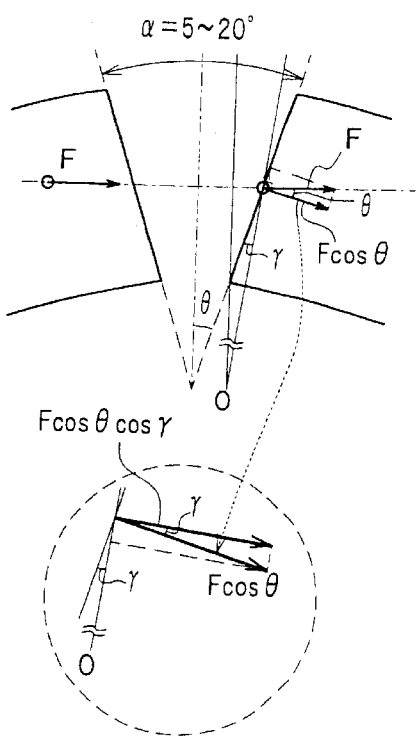
FIG. 8D is a vector view showing the direction and magnitude of the rotational resistance acting on the friction plate according to the present invention.

The angle of divergence α of 5–20 degrees, preferably 10–11 degrees comes from the fact, which has been verified by an experiment, that a component of the rotational resistance force (Fcosθcosγ) is converted into the component (Fsinθcosθ), which is big enough to assist the lubricant discharge as shown in FIGS. 8C and 8D, when the angle of divergence α is set to be not less than 5 degrees. When it is less than 5 degrees, the lubricant entering circumferentially will stay in each of the oil passages 4b to degrade the lubricant discharge capability.

The general duct resistance h is expressed as the product of the difference between a flow velocity v1 at the inlet of the duct P and a flow velocity v2 at the outlet and the loss factor ζ:

$$h = \zeta \times (v1 - v2) \times 2/2 \ g$$

g: gravitational acceleration

Figure 9:
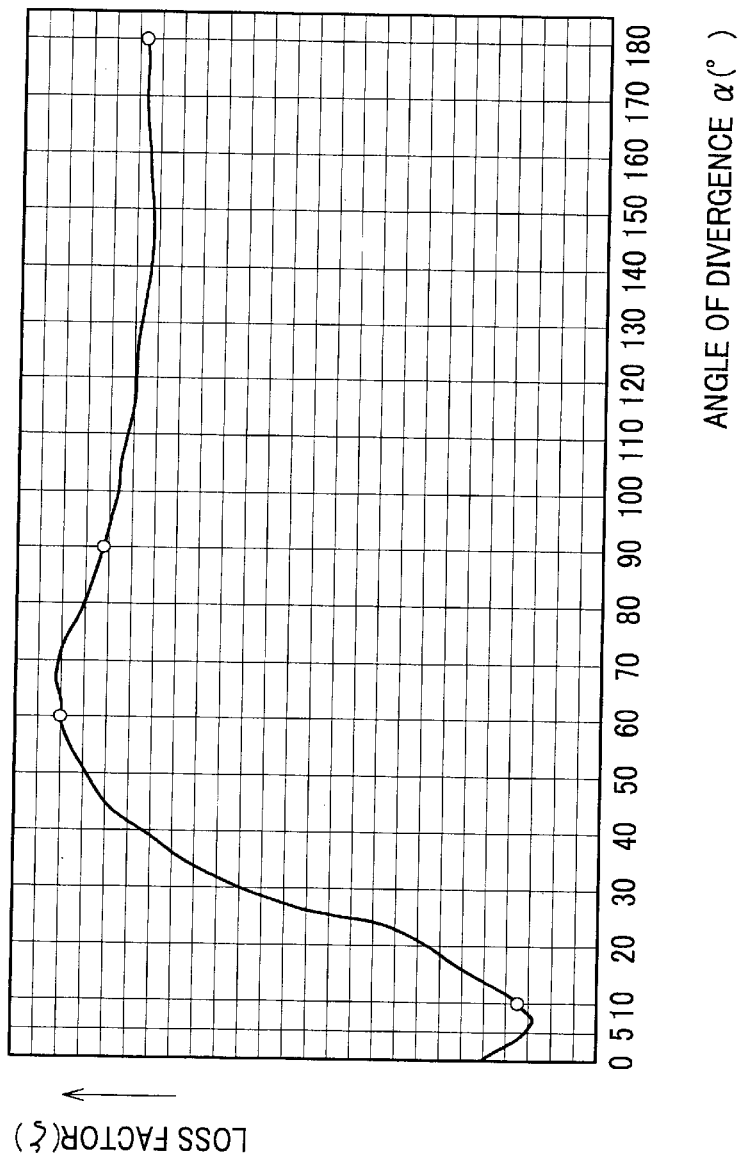
FIG. 9 is a view showing the relation between the loss factor of a duct and the angle of divergence.

As shown in FIG. 9 when the angle of divergence α exceeds 20 degrees, the drop in the flow velocity at the outlet 4d of each of the oil passages 4b (corresponding to v2 in the above expression) is so significant that the value of (v1−v2)×2/2 g increases. The loss factor ζ grows steeply in parallel, thereby increasing the duct resistance h to worsen the lubricant discharge resistance. When the angle of divergence α exceeds 20 degrees, the width (groove width) of the outlet 4d of each of the oil passages 4b becomes exceedingly large. Accordingly, the bearing stress of each of the friction elements 4a increases, thereby decreasing the durability.

If each of the friction elements 4a is designed so that the bearing stress meets the allowable design value assuming the angle of divergence α exceeding 20 degrees, the length of each of the friction elements 4a will be so large that it is disadvantageous for the layout.

The discussions described above will conclude that the angle of divergence α of each of the oil passages 4b should be 5–20 degrees, preferably 10–11 degrees.

The operation of the wet multiple-plate clutch C will be described referring to FIGS. 1 and 2.

When an engine is started and the engine power shaft Ss0 is driven rotationally as shown in FIG. 1, the main shaft Sm is driven through the fluid coupling C0. The input gear 2 of the clutch center 1 continuously meshes with the gear G3 which is for third speed shifting of the main shaft Sm. The lubricant supplied to the clutch center 1 passes through a plurality of oil holes 1b and lubricates the contact areas of the friction elements 4a and each of the separation plates 5 traveling circumferentially. Subsequently, it is discharged outward radially through a plurality of oil holes 3b of the clutch guide 3.

When the working fluid is supplied to the clutch fluid reservoir 9 through the working fluid passage 10 of the sub-shaft Ss3 to engage the wet multiple-plate clutch C, the clutch piston 8 is displaced toward the end plate 6 resisting the urging force of the return spring 11. Once the friction plates 4 and the separation plates 5 are held in unison interposed between the end plate 6 and the clutch piston 8, the torque of the main shaft Sm is transmitted from the friction plates 4 to the separation plates 5.

In order to disengage the wet multiple-plate clutch C the supply of the lubricant to the gaps between the separation plates 5 and the friction plates 4 is terminated as well as the discharge of the working fluid through the working fluid passage 10. The lubricant staying upstream the inlet 4c of each of the oil passages 4b shown in FIG. 2 will prevent the seizure of the separation plates 5 and the friction plates 4. The lubricant remaining in each of the oil passages 4b is discharged by the centrifugal force. Thus, the seizure and the accompanying rotation of the separation plates 5 induced by the friction plates 4 are restricted, thereby improving the power loss caused by the accompanying rotation.

Figure 4:
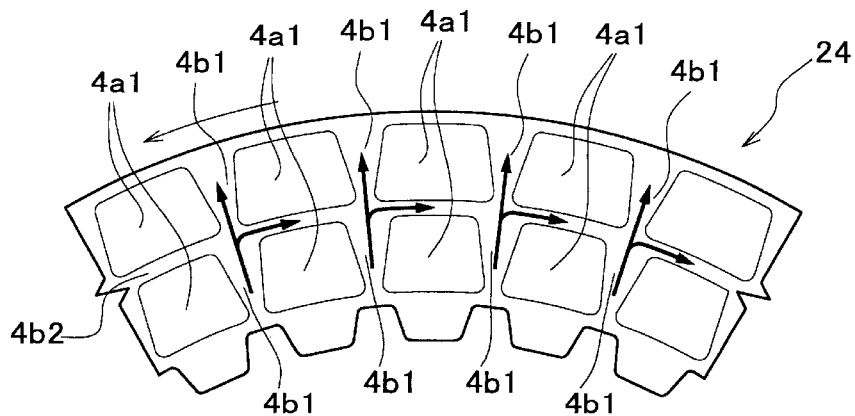
FIG. 4 is a detailed view showing a second embodiment of the wet friction plate of the present invention.
Figure 5:
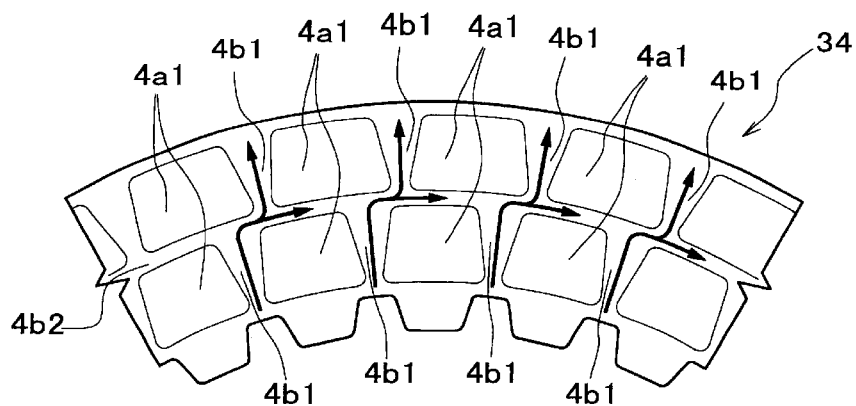
FIG. 5 is a detailed view showing a third embodiment of the wet friction plate of the present invention.
Figure 6:
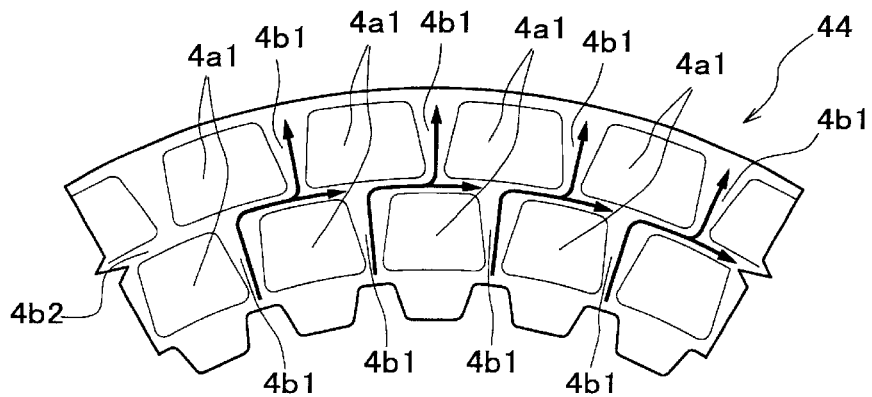
FIG. 6 is a detailed view showing a fourth embodiment of the wet friction plate of the present invention.

Three additional embodiments of the friction plate are shown in FIGS. 4–6.

A second embodiment of the friction plate according to the present invention is shown in FIG. 4.

As shown in FIG. 4 a plurality of friction elements 4a1 are fixed on both sides of plurality of friction plates 24 spacing at the regular intervals circumferentially and radially to transmit the torque to a plurality of separation plates 5. Between respective circumferentially neighboring pairs of the friction elements 4a1 are formed a plurality of radial oil passages 4b1. Between respective radially neighboring pairs of the friction elements 4a1 is formed a circumferential oil passage 4b2.

The width of each of the radial oil passages 4b1 increases progressively from inward to outward radially the same way that of the above-mentioned embodiment does. On the other hand, the width of the circumferential oil passage 4b2 is uniform.

The width of the inlet of each of the radial oil passages 4b1 is determined so that the minimum amount of the lubricant required for lubrication can remain upstream the inlet assisted by the reduction effect of the inlet while the friction plates 24 are rotating, taking into account the rotational velocity of the friction plates 24.

The radially multiple-stage arrangement of the friction elements 4a1 generates high pressure at the intersection of each of the radial oil passages 4b1 and the circumferential oil passage 4b2. Because the gaps between the friction plates 24 and the separation plates 5 are controlled to be uniform, the accompanying rotation of the separation plates 5 induced by the friction plates 24 is prevented while the wet multiple-plates clutch C is in disengagement. Compared with the case without the circumferential oil passage 4b2, the frictional resistance of the lubricant decreases since the length of each of the radial oil passages 4b1 is rendered shorter. Further, the lubricant can be discharged with the smaller centrifugal force as well as the increase in the rate of the lubricant discharge since the radial oil passages 4b1 and the circumferential oil passage 4b2 are interconnected. It leads to the prevention of the accompanying rotation of the separation plates 5 induced by the friction plates 24 as a result of the remaining lubricant while the wet multiple-plate clutch C is in disengagement.

A third embodiment of the friction plate according to the present invention is shown in FIG. 5. This embodiment has a given circumferential offset between some of the friction elements 4a1 situated in the outer ring and the others situated in the inner ring, compared with the second embodiment described in FIG. 4. When a plurality of friction plates 34 is configured like this, the lubricant can be discharged efficiently in the direction of the arrows shown in FIG. 5 because the Coriolis force (apparent inertial force acting in the reverse direction of the rotation of the friction plates 34) is exerted on the lubricant effectively.

This embodiment also reduces power loss by preventing the accompanying rotation of the separation plates 5 induced by the friction plates 34.

FIG. 6 shows a fourth embodiment of the friction plate according to the present invention. As shown in FIG. 6 this embodiment has the offset of half pitch between some of the friction elements 4a1 situated in the outer ring and the others situated in the inner ring, compared with another embodiment described in FIG. 5. When a plurality of friction plates 44 is configured such as this, the lubricant can be discharged smoothly through the radial oil passages 4b1 and the circumferential oil passage 4b2 in the direction of the Coriolis force. The offset of half pitch simplifies the positioning of the friction elements 4a1 when they are fixed on the friction plates 44, thereby improving the efficiency of assembly.

Figure 7:
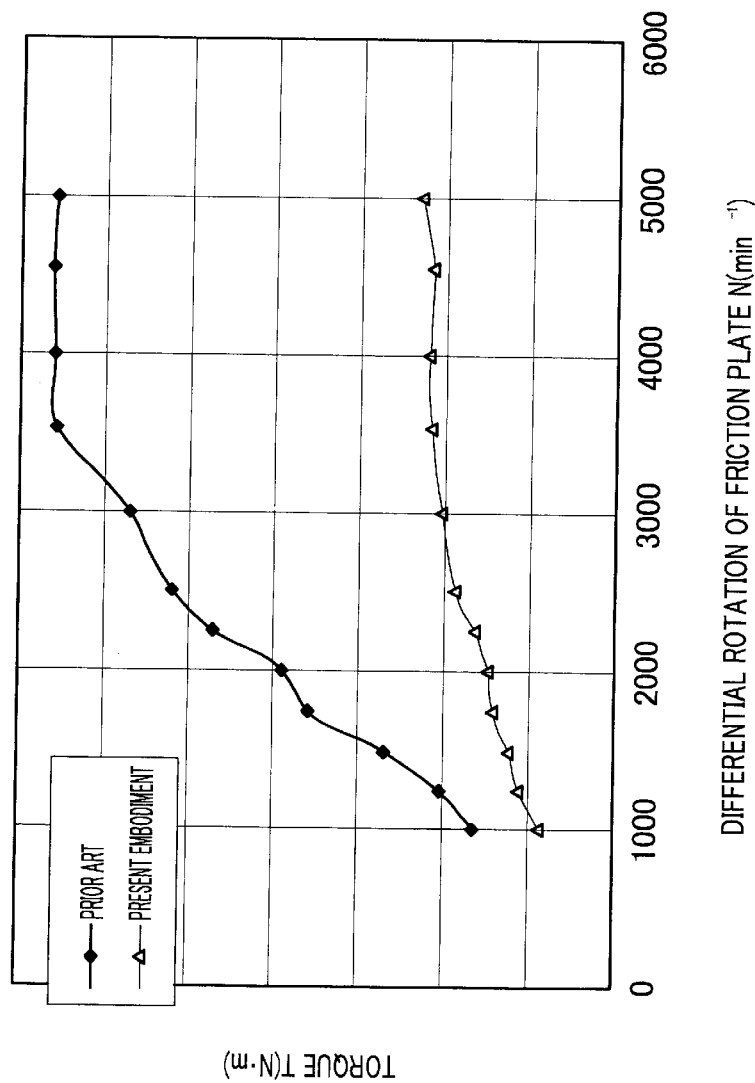
FIG. 7 shows the torque vs. the differential rotation of the friction plate in disengagement when the friction plate according to the prior art or an embodiment of the present invention is installed in a wet multiple-plate clutch.

FIG. 7 shows the torque (N.m) vs. the differential rotation (min$^{-1}$) of the friction plates 34 (the embodiment of the present invention) when the friction plates 34 shown in FIG. 5 are installed in the wet multiple-plate clutch C, which is in disengagement. It also shows the torque (N.m) vs. the differential rotation (min$^{-1}$) of the friction plates (the prior art) when the friction plates which have the radial oil passages between the neighboring friction elements are installed in a wet multiple-plate clutch, which is in disengagement.

The variation of the torque of the present invention is stable and its magnitude decreases remarkably compared with those of the prior art.

Therefore, it is demonstrated that the accompanying rotation of the separation plates 5 induced by the friction plates 34 can be prevented since the torque of the friction plates 34 is decreased by appropriate discharge of the lubricant remaining in the oil passages while the wet multiple-plate clutch C is in disengagement.

The wet multiple-plate clutch C is applied not only to the third speed of an automatic transmission but also to another speed of it. It may also be utilized as a clutch for coupling multiple axes or a brake.

When the friction plates 4, 24 34 and 44 according to the present invention are installed in a wet multiple-plate brake as friction plates, the accompanying rotation of the separation plates 5 is restricted during the brake release, so that the power loss caused by braking is improved.

What is claimed is:

1. A wet friction plate assembly for a wet multiple-plate clutch or a wet multiple-plate brake, comprising:

a plurality of separation plates;

a plurality of friction elements; and a plurality of friction plates, on contact surfaces of which said plurality of friction elements are fixed for transmitting torque to said plurality of separation plates in pressure contact, wherein said plurality of friction elements are disposed spacing at regular intervals circumferentially on each contact surface of said plurality of friction plates to form a plurality of oil passages for a lubricant between respective neighboring pairs of said plurality of friction elements, wherein said plurality of oil passages extend radially on each of said plurality of friction plates, and wherein a width of each of said plurality of oil passages is increased progressively in a direction of inward to outward radially of each of said plurality of friction plates, and an angle of divergence of each of said plurality of oil passages is adapted to be symmetrical relative to a centerline thereof.

2. A wet friction plate assembly for a wet multiple-plate clutch or a wet multiple-plate brake, comprising:

a plurality of separation plates;

a plurality of friction elements; and a plurality of friction plates, on contact surfaces of which said plurality of friction elements are fixed for transmitting torque to said plurality of separation plates in pressure contact, wherein said plurality of friction elements are disposed spacing at regular intervals and arranged in inner and outer rings both radially and circumferentially on each contact surface of said plurality of friction plates to form a plurality of radial and circumferential oil passages between respective neighboring pairs of said plurality of friction elements, wherein said plurality of radial oil passages extend radially on each of said plurality of friction plates, and wherein a width of each of said plurality of radial oil passages is increased progressively in a direction of inward to outward radially of each of said plurality of friction plates, and an angle of divergence of each of said plurality of radial oil passages is adapted to be symmetrical relative to a centerline thereof.

3. A wet friction plate assembly according to claim 2, wherein some of said plurality of friction elements situated in said outer ring are offset circumferentially from the others of said plurality of friction elements situated in said inner ring.

4. A wet friction plate assembly according to claim 2, wherein some of said plurality of friction elements situated in said outer ring are offset a half pitch circumferentially from the others of said plurality of friction elements situated in said inner ring.

* * * * *